United States Patent [19]

Moult et al.

[11] 3,919,151
[45] Nov. 11, 1975

[54] PREPARATION OF LOW FREE RESORCINOL CONTAINING RESORCINOL-PHENOL COPOLYMER RESINS

[75] Inventors: Roy H. Moult, Murrysville; John J. Colligan, Valencia, both of Pa.

[73] Assignee: Koppers Company, Inc., Pittsburgh, Pa.

[22] Filed: Aug. 9, 1974

[21] Appl. No.: 496,057

Related U.S. Application Data

[63] Continuation of Ser. No. 309,501, Nov. 24, 1972, abandoned.

[52] U.S. Cl. ............ 260/29.3; 156/110 A; 156/335; 260/54
[51] Int. Cl.² .................................. C08L 61/12
[58] Field of Search ........................ 260/54, 29.3

[56] References Cited
UNITED STATES PATENTS

| | | | |
|---|---|---|---|
| 1,802,390 | 4/1931 | Novotny | 260/54 |
| 1,889,751 | 12/1932 | Kessler | 260/54 |
| 2,128,635 | 8/1938 | Church et al. | 260/29.3 |
| 2,433,143 | 12/1946 | Mohrman | 260/621 |
| 2,489,336 | 11/1949 | Spahr et al. | 260/54 |
| 2,614,096 | 10/1952 | Spahr | 260/54 |
| 3,210,309 | 10/1965 | Baker et al. | 260/29.3 |
| 3,328,354 | 6/1967 | Dietrick | 260/54 |
| 3,422,068 | 1/1969 | Kreibich et al. | 260/52 |

*Primary Examiner*—Howard E. Schain
*Attorney, Agent, or Firm*—Oscar B. Brumback

[57] ABSTRACT

There is disclosed a resin which is formed by the precondensing of about equal amounts of phenol and formaldehyde, then reacting this precondensate with resorcinol, removing water and phenol by distillation to leave a resinous residue, adding water to the residue and adding additional formaldehyde thereto to react with any free resorcinol.

1 Claim, No Drawings

3,919,151

PREPARATION OF LOW FREE RESORCINOL CONTAINING RESORCINOL-PHENOL COPOLYMER RESINS

CROSS-REFERENCE TO RELATED INVENTIONS

This is a continuation of application Ser. No. 309,501, filed Nov. 24, 1972, now abandoned.

This invention relates to a phenol-formaldehyde-resorcinol resin and is an improvement over the resin described in a copending application, Ser. No. 232,270 "Tire Cord Dips For Polyester Fibers," filed Mar. 6, 1972, and assigned to the assignee of this application, now abandoned.

BACKGROUND OF THE INVENTION

This invention relates generally to phenol-formaldehyde-resorcinol resins. More particularly, the invention relates to such resins for use as adhesives and in the manufacture of tires.

Tire cords made of polyester fibers are increasingly being used in the manufacture of tires for automobiles and the like. The use of polyester tire cords, however, has created problems in that adhesives which have conventionally been used for promoting the bonding of the tire cords to rubber did not work well when the tire cords were polyester tire cords, even though the adhesive worked well with other types of tire cords. The reason for this problem is not completely known even though considerable investigation has been carried out in trying to improve the bonding of a polyester tire cord to the rubber of the tire. Copending application Ser. No. 232,270 illustrates one approach to the production of a resin which will bond a polyester tire cord to rubber.

The resin of copending application Ser. No. 232,270 is made by a process wherein about equal parts of phenol and formaldehyde are reacted under alkaline conditions to form a precondensate. Resorcinol is then added to this precondensate to react with the precondensate. Any unreacted phenol and any water are removed by distillation, which distillation also tends to drive the reaction of the precondensate with the resorcinol to completion. Thereafter, the resin is washed with water to remove any unreacted resorcinol and low molecular weight polymers (oligomers).

SUMMARY OF THE INVENTION

It has now been found that the unreacted resorcinol need not be removed from the resin, which has been purified of the unreacted phenol and water through distillation. Instead, additional formaldehyde may be added to react with the resorcinol that remains after the phenol distillation step.

In accordance with this invention the resin is made following the procedure of the forementioned application Ser. No. 232,270, except that the final washing step described in the aforementioned application to remove unreacted resorcinol is eliminated. In accordance with this invention after the unreacted phenol and the water of reaction have been removed from the resin by distillation, the resin is then placed in water and additional formaldehyde is added to react with the free resorcinol in the water. Surprisingly, this provides a resin which has even better adhesive properties. The resin is particularly desirable for use in the bonding of polyester to rubber.

DETAILED DESCRIPTION

As a general procedure, the novel resin of this invention is prepared by reacting about equal molar amounts of phenol and formaldehyde in an aqueous alkaline medium to form a precondensate. Thereafter, there is added to the precondensate, for reaction therewith, a molar quantity of resorcinol of about half the molar amount of phenol originally used. The resorcinol so added reacts with the precondensate and the reaction mass is subject to distillation to remove any unreacted phenol and the water of reaction. The distillation temperature also tends to drive the reaction of the precondensate with resorcinol to completion. Water is then added to the residue from the distillation and additional formaldehyde is added to chemically bind any free resorcinol and low molecular weight reactive resorcinol compound with the formaldehyde. The resulting resin can then be rendered soluable in the aqueous medium by raising the pH of the solution.

The following will serve to illustrate a specific example of the invention, using as many of the steps and quantities of the example of the foregoing copending application Ser. No. 232,270 as practical.

To a reactor fitted with a stirrer, thermometer, and facilities for either reflux or distillation were charged 46.4 Parts per weight 90 % phenol. Agitation was started, and 30.8 parts of a 37% solution of formaldehyde and water and 1.9 parts of 50% aqueous caustic were added. The pH of the reaction mass was between 8.9 and 9.0. The reaction mass was heated to reflux and reflux was continued until the dilutability of the reaction mass was between 1:1.1 to 1:0.9. Then 20.9 parts of resorcinol were added, and the condensation product was held at reflux for one hour. The mole ratio of phenolic compound (phenol plus resorcinol) to formaldehyde was 1 to 0.63. The mole ratio of phenol to resorcinol was 70 to 30. Atmospheric distillation was started at the end of the reflux period and a major portion of the water is removed by the time the temperature of the vessel contents reached 130°C. Thereafter, distillation was continued under reduced pressure to remove substantially all of the water and the major portion of the unreacted phenol. A vacuum of 26 to 28 inches was built up from 0 as the distillation progressed and the temperature increased to 165°–170°C.

The foregoing follows the early process steps outlined in the aforementioned application Ser. No. 232,270. In accordance with that application, the unreacted resorcinol and the oligomers are washed from the resin and discarded. The washed product gives heat-resistant adhesive bond when the resin is used, for example, in adhering polyester tire cords to rubber. The washing, however, creates problems in the yield of the product and in ecology in that disposal of the washings is difficult.

In accordance with this invention, the residue from the distillation is not washed but has added to it sufficient aldehyde, for example, formaldehyde to react with the free resorcinol and oligomers.

In accordance with this invention at the point in the distillation of the free phenol and water when it appears that the volatiles have been removed, i.e., at the temperature of 165°–175°C, a volume of water about twice the volume of residue is added to the residue in the still, thereby cooling the residue to about reflux temperature at atmospheric pressure. The mixture will comprise two phases; one phase being an oily resin-containing medium, and the other phase being an aqueous medium containing resorcinol and low molecular weight, water-soluable oligomers. With agitation of the mixture, additional formaldehyde in sufficient amount to react with the free resorcinol is added. The amount to be added is not particularly critical. This amount can be, however, determined by an analysis of the resorcinol content of the aqueous phase. The reaction of the resorcinol and formaldehyde occurs almost solely in the aqueous phase so that a small amount, i.e., 2% or less of resorcinol that has been in the resin phase remains. After the reaction, the pH of the reaction mass is raised to 9 or more, for example, by the addition of sodium hydroxide, and the mixture becomes a uniform solution.

The resorcinol formaldehyde resins which are formed with the additional formaldehyde are believed to exist as molecules separate from the phenol-formaldehyde-resorcinol molecules. Consequently then, molecules along with the phenol-formaldehyde-resorcinol molecules give the resin products physical and chemical proportions that differ from those of the resin product of application Ser. No. 232,270. For example, the resin product of this invention has greater solubility so that the aqueous solution can have a solid content of 39–40%, whereas the aqueous solution of application Ser. No. 232,270 is about 26–27%. Yet the viscosity of the aqueous solution of the product of this invention will have a viscosity of 4–5 poises, whereas the product of application Ser. No. 232,270 will have a viscosity of 35–85 poises despite the aqueous solution of the product of this invention having a higher solids content. The product of this invention is also a product which is self curing at elevated temperatures.

We claim:

1. A phenol-formaldehyde-resorcinol resin prepared
   1. by reacting a mixture of 60–70 moles of phenol and 60–70 moles of formaldehyde at a temperature of between about 60°C. and the boiling point of the phenol-formaldehyde reaction mixture under the mildly alkaline conditions of an initial pH of 8 to 10 that are provided by aqueous caustic until said mixture has a dilutability of 1:1.2 to 1:0.8 at the pH of said reaction mixture;
   2. adding 30–40 moles of resorcinol to said reaction mixture at the foregoing temperature whereby said resorcinol reacts to form a phenol-formaldehyde-resorcinol resin;
   3. distilling the mixture to remove as distillate substantially all the volatiles such as water and unreacted phenol;
   4. adding to the residue a volume of water that is about twice the volume of said residue whereby there is formed an oily phase and an aqueous phase, the unreacted resorcinol being substantially in the aqueous phase;
   5. adding sufficient formaldehyde to said aqueous phase to react with unreacted resorcinol in said phase; and thereafter
   6. raising the pH value of the reaction mixture to a pH of at least 9 whereby the mixture becomes a uniform solution, the resin in said solution having a solubility such that the said solution can have a solids content of 39–40% and said resin being self-curing at elevated temperatures.

* * * * *